No. 828,472. PATENTED AUG. 14, 1906.
W. GLADER.
APPARATUS FOR MAKING CELLULOSE VESSELS.
APPLICATION FILED JAN. 13, 1906.

5 SHEETS—SHEET 1.

Witnesses
Inventor
William Glader
By Kindt & Birmingham
Attys.

No. 828,472. PATENTED AUG. 14, 1906.
W. GLADER.
APPARATUS FOR MAKING CELLULOSE VESSELS.
APPLICATION FILED JAN. 13, 1906.

5 SHEETS—SHEET 3.

Witnesses

Inventor
William Glader
By Kindt & Birmingham
Atty's

No. 828,472. PATENTED AUG. 14, 1906.
W. GLADER.
APPARATUS FOR MAKING CELLULOSE VESSELS.
APPLICATION FILED JAN. 13, 1906.
5 SHEETS—SHEET 4.

Witnesses
Inventor
William Glader
By Kindt & Birmingham
Atty's

No. 828,472. PATENTED AUG. 14, 1906.
W. GLADER.
APPARATUS FOR MAKING CELLULOSE VESSELS.
APPLICATION FILED JAN. 13, 1906.

5 SHEETS—SHEET 5.

Witnesses
Carle H Schafer
K. Schaff

Inventor
William Glader.
By Kindt & Birmingham
Attys

UNITED STATES PATENT OFFICE.

WILLIAM GLADER, OF CHICAGO, ILLINOIS, ASSIGNOR, BY MESNE ASSIGNMENTS, TO CELLULOSE PACKAGE MANUFACTURING COMPANY, OF CHICAGO, ILLINOIS, A CORPORATION OF ILLINOIS.

APPARATUS FOR MAKING CELLULOSE VESSELS.

No. 828,472.  Specification of Letters Patent.  Patented Aug. 14, 1906.

Application filed January 13, 1906. Serial No. 295,982.

*To all whom it may concern:*

Be it known that I, WILLIAM GLADER, a citizen of the United States, residing at Chicago, in the county of Cook and State of Illinois, have invented certain new and useful Improvements in Apparatus for Making Cellulose Vessels or Receptacles, of which the following is a specification.

This invention relates to machines for making vessels or receptacles from cellulose more or less impure or other like material; and the object is to provide a machine by means of which a vessel or receptacle can be easily and quickly formed and to provide a mold in which pressure is exerted against the walls and bottom of the pail simultaneously.

A further object is to provide a machine in which the cellulose-pulp is fed into the top of the mold and to provide a plunger which operates vertically and which will when placed in the mold form the inner walls against which the said cellulose-pulp is pressed during the formation of the receptacle.

A further object is to so form the inner surface of the segments which compress the pulp that the pulp will not adhere thereto when the segments are drawn away after the formation of said receptacles.

A further object is to provide means on the plunger which will enable the vessel or receptacle to be released therefrom when said plunger with the receptacles adhering thereto is raised out of the mold.

Figure 1:
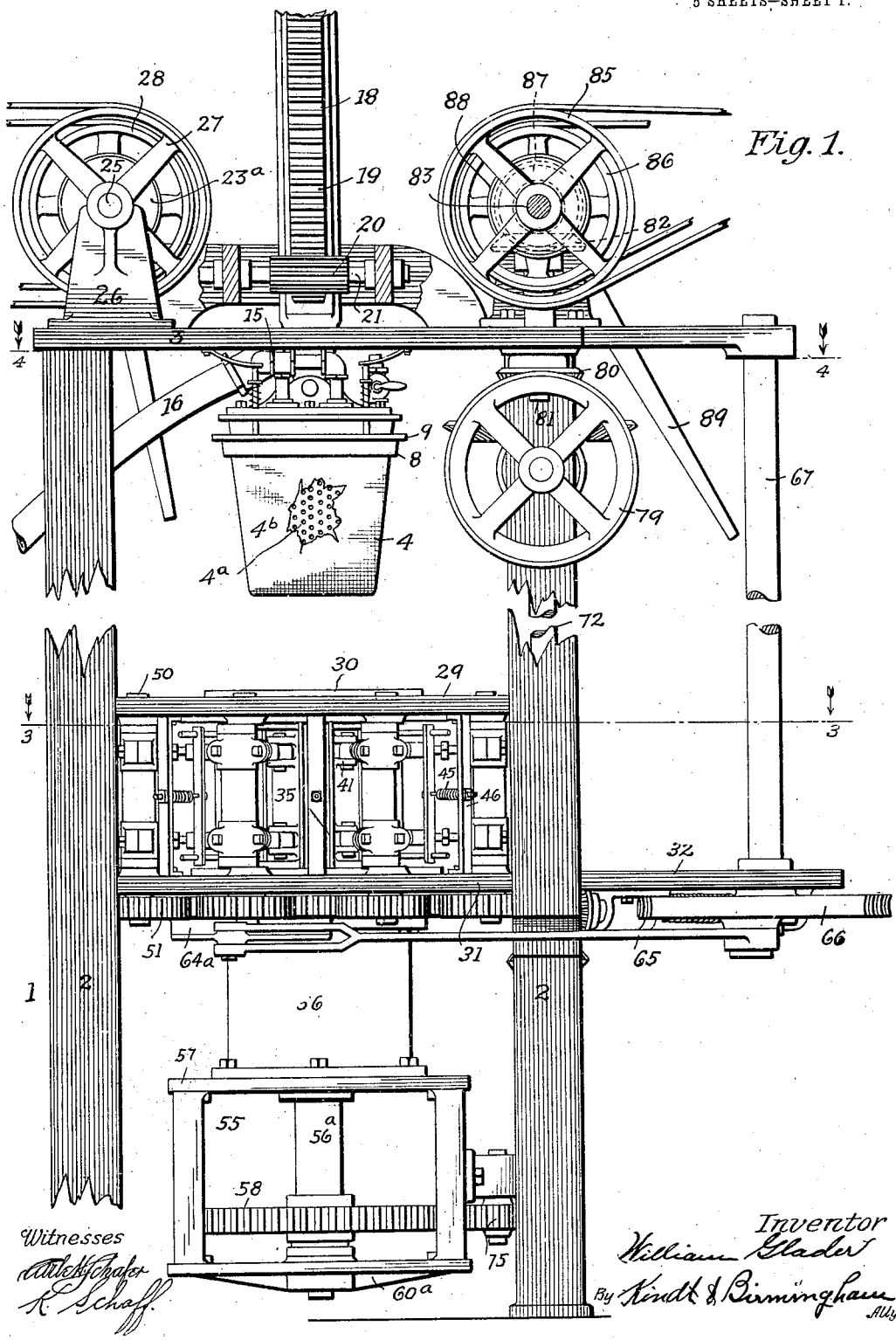
Figure 2:
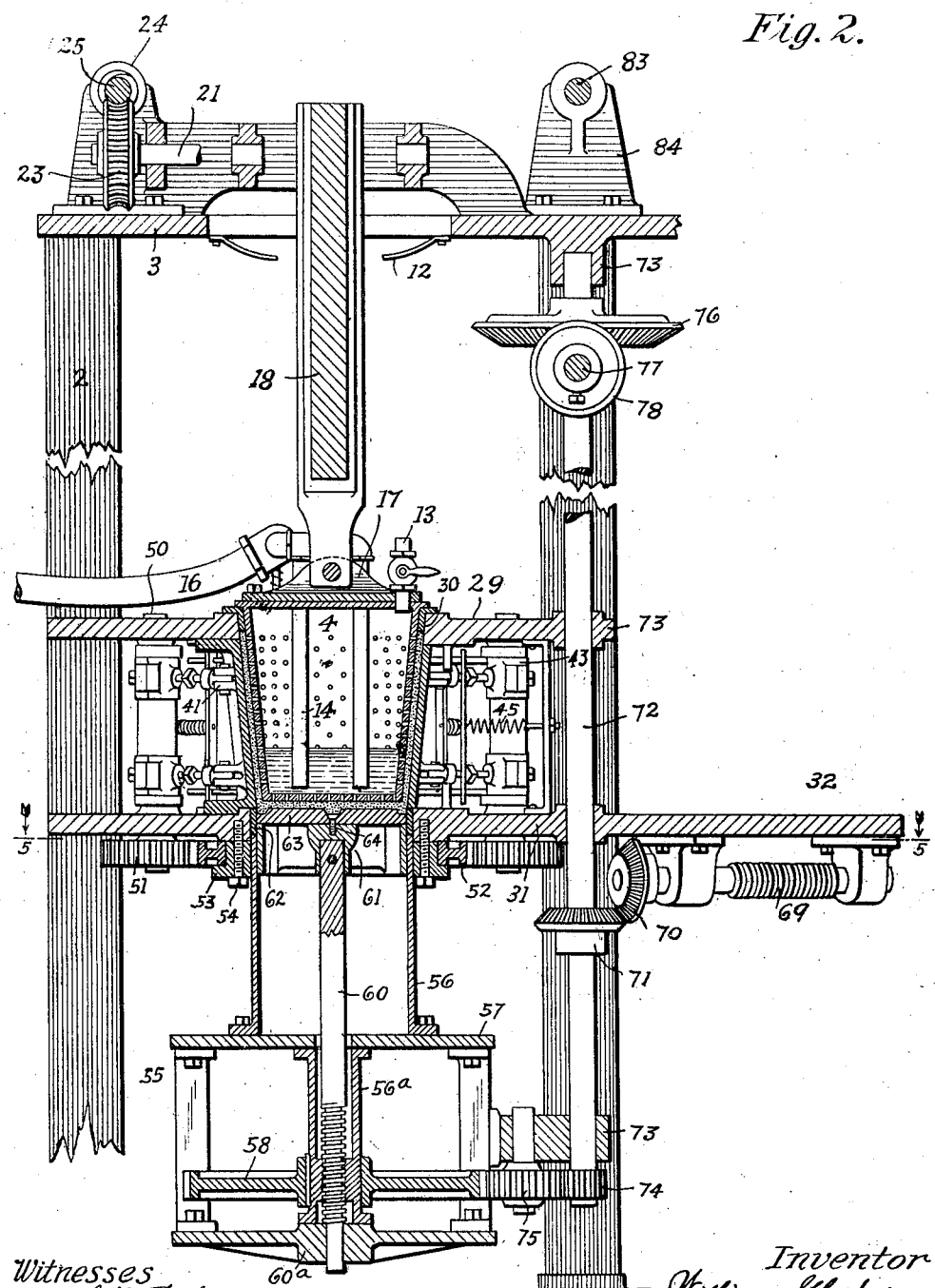
Figure 3:
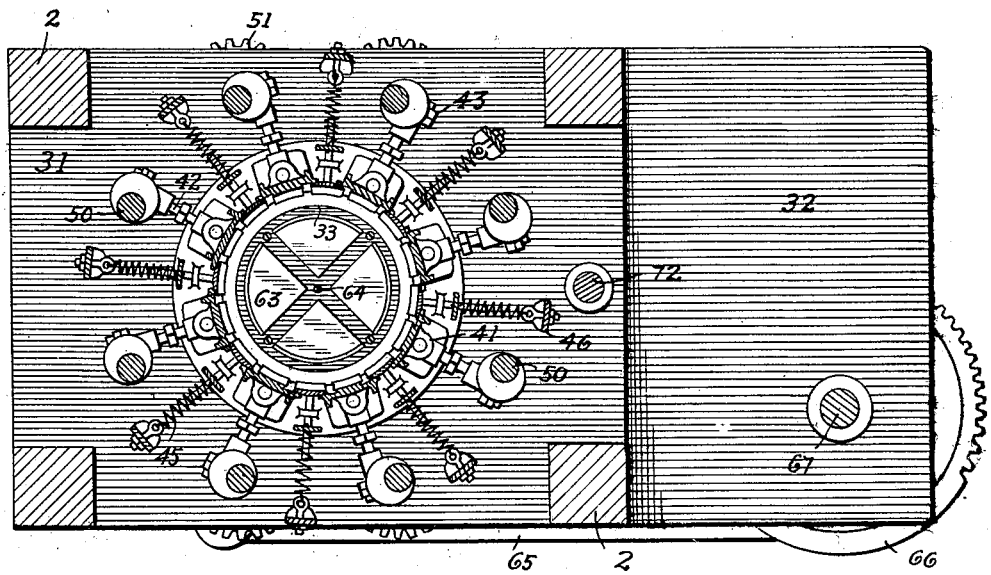
Figure 3:
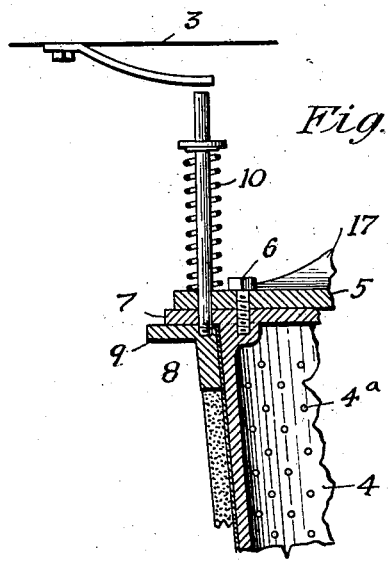
Figure 3:
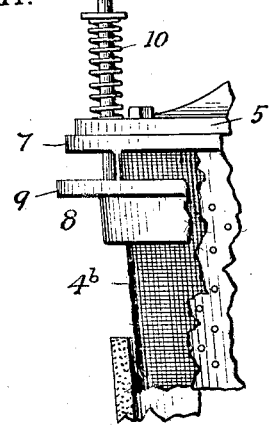
Figure 4:
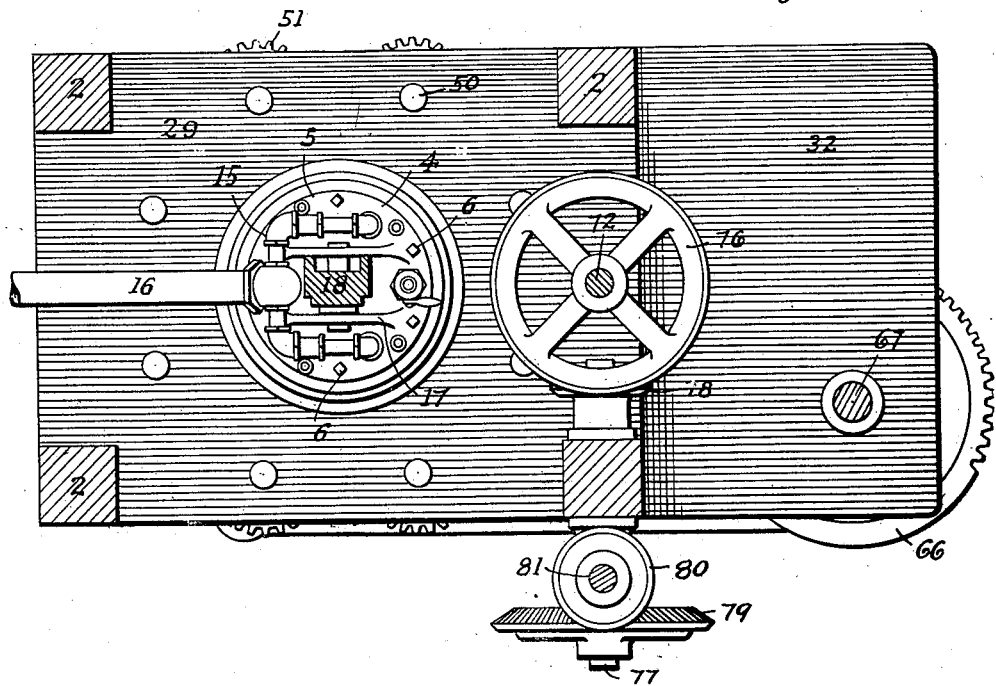
Figure 5:
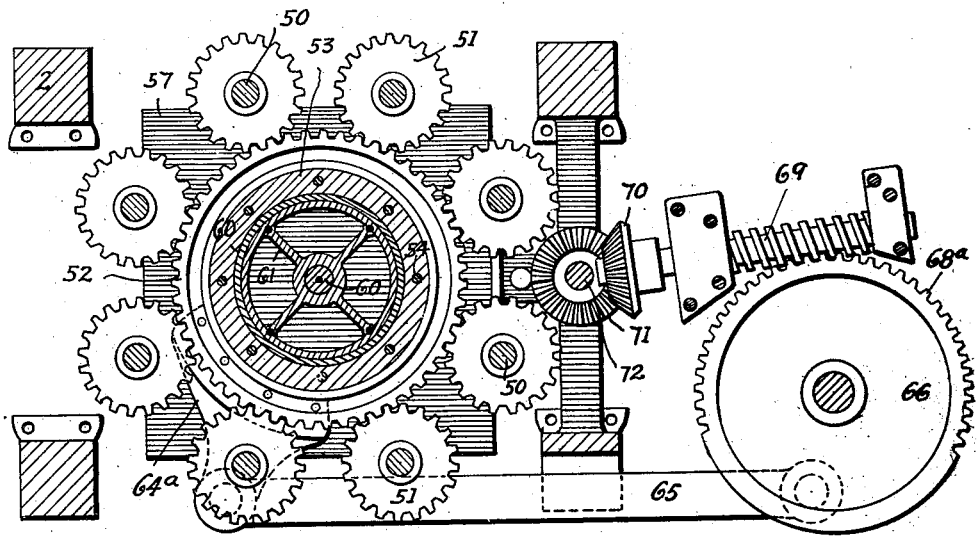
Figure 6:
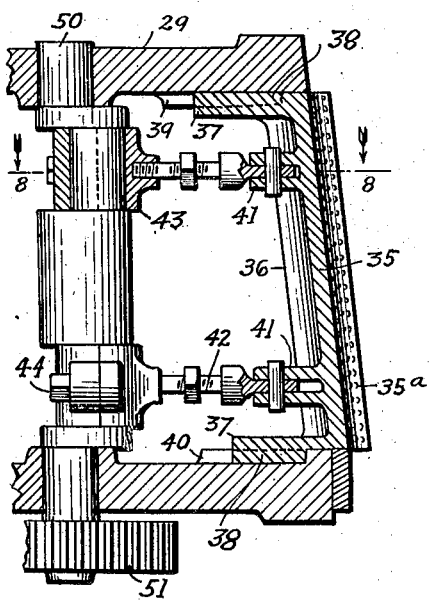
Figure 8:
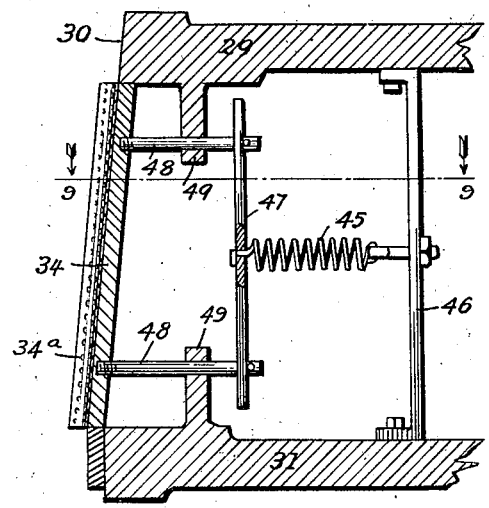
Figure 7:
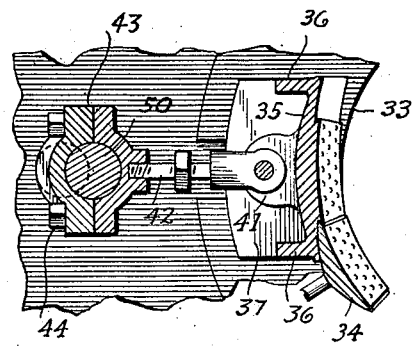
Figure 9:
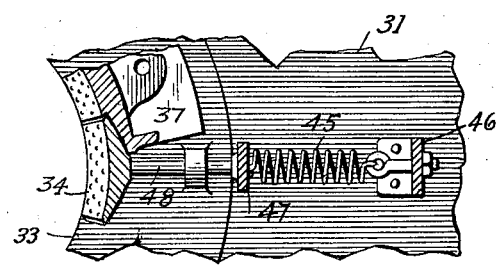

In the accompanying drawings, Figure 1 is a side view of my improved apparatus for making cellulose vessels or receptacles, showing the plunger in its raised position. Fig. 2 is a vertical section of same, showing the plunger in its downward position. Fig. 3 is a cross-section taken on line 3 3 of Fig. 1. Fig. 4 is a cross-section taken on line 4 4 of Fig. 1. Fig. 5 is a cross-section taken on line 5 5 of Fig. 2. Fig. 6 is a detail view of the stave and eccentric-shaft connections. Fig. 7 is a plan view of same in section. Fig. 8 is a detail view of the segment, showing the means for holding same in outward position. Fig. 9 is a plan view of same in section. Fig. 10 is a detail view of the means for releasing the receptacle from the plunger, shown in its normal position; and Fig. 11 is a detail view of same, showing the releasing-rim in its downward position.

The main frame (indicated by the reference-numeral 1) comprises a series of standards 2 and supporting-braces 3.

The plunger 4, upon which the article is pressed, comprises a hollow frustum-shaped cone, which is provided with perforations $4^a$ and covered with fabric $4^b$. The plunger is attached to a head 5 by means of screws or bolts 6. The upper portion of plunger 4 is provided with the flange 7. A releasing-rim 8, provided with the flange 9, is adapted to encircle the upper portion of the plunger and is normally held in contact with flange 7 by means of the spiral spring 10, encircling post 11. This post is rigidly secured to the rim 8 and extends through openings in the flange 7 and head 5. The upper portion of the post 11 will engage the contact-springs 12, secured underneath the brace 3. Thus when the plunger 4 having a receptacle adhering thereto is raised upward the upper portion of post 11 will come in contact with the spring 12, which will cause the spiral spring 10 to be compressed and force the rim 8 downward, thus forcing the receptacle from the plunger 4.

An air-valve 13 is secured in the head 5 and extends into the hollow plunger 4. Pipes 14 are adapted to extend through the head 5 and into plunger 4. The upper portion of these pipes are secured to a bifurcated extension 15 and a pipe 16 coupled to said extension. In the center of the head 5 is the projection 17. To this projection is secured the end of the rack-bar 18, carrying the teeth 19. Teeth 19 mesh with pinion 20, which is carried by shaft 21, and shaft 21 is journaled in the bearings mounted in the upper end of the frame 1. To one end of the shaft 21 is secured a worm-gear 23. This gear meshes with worm-gear 24 and is carried by shaft 25. Shaft 25 is journaled in the extensions 26 and carries the driving-pulleys 27 and 28. A friction-clutch $23^a$ is disposed between the pulleys 27 and 28.

An upper plate 29 is supported by the standards 2, and intermediate of the plate 29 is an opening 30. A base-plate 31 is also supported by the standards 2. One end of this plate extends beyond the standards 2, forming a table 32. Intermediate of the base-plate 31 is an opening 33.

The mold into which the pulp is placed is composed of a series of segments 34 and staves 35. These segments and staves are disposed between the upper plate 29 and the base-plate 31. The inner surface of the stave 35 is knurled, as shown at 35$^a$, and slightly concave and is provided on each side thereof with flanges 36. The upper and lower portion of the stave 35 is provided with extensions 37. These extensions are provided with the groove 38. A rib 39 is formed on the under surface of the upper plate 29 and a similar rib 40 is on the upper surface of the base-plate 31. Extensions 41 are formed on the upper and lower ends of the rear portion of the stave 35. When said stave is placed in position between the upper plate 29 and the base-plate 31, the ribs 39 and 40 will engage the grooves 38, formed in the extensions 37. One end of connecting-rod 42 is secured to projections 41 and the opposite end thereof to clamps 43. These clamps are secured to the upper and lower ends of the eccentric shaft 43 by means of screws or bolts 44.

The segment 34 is slightly concave, having its inner surface knurled at 34$^a$, and said segment is disposed between the upper plate 29 and the base-plate 31. This segment is adapted to rest against the flanges 36 of the stave 35, and is normally held in contact therewith by means of the spiral spring 45. One end of this spring is secured to the bracket 46 and the opposite end thereof to bar 47, which engages the rods 48. These rods pass through openings on the extensions 49 and are secured to the segment 34. There are a plurality of the staves and segments secured as previously described and disposed in the manner as clearly shown in Fig. 3 of the drawings. A series of eccentric shafts 50 are journaled in the upper plate 29 and the base-plate 31. To that portion of shaft 50 which extends beneath base-plate 31 are rigidly secured pinions 51. These pinions are adapted to mesh with a gear-wheel 52. This gear-wheel is held in operative position by means of the collar 53, which is secured to the under surface of base-plate 31 by the screws or bolts 54.

An auxiliary frame 55 is secured to the standards 2 in the lower portion of the frame 1. A cylinder 56 is secured to the top plate 57. The upper portion of said cylinder extends part way through the opening 33 in the base-plate 31. A gear-wheel 58 is rigidly secured to sleeve 56$^a$. This sleeve has screw-threads in the lower portion thereof, which engage the screw-threads on shaft 60. The lower end of shaft 60 is journaled in bearing-plate 60$^a$ and the opposite end extends through plate 57 and is provided with spider 61. A rim 62 is placed in the opening 33 and adapted to rest upon the upper end of cylinder 56, and a die 63 is secured to the upper portion of spider 61 by means of screws 64. This die operates within the rim 62 and compresses and forms the bottom of the receptacle. A yoke 64$^a$ is secured to gear-wheel 52, to which is secured one end of connecting-rod 65. The opposite end of connecting-rod 65 is secured to worm-gear 66. This worm-gear is secured to one end of shaft 67, which is journaled in the frame 1 and the opposite end journaled in the table 32. Worm-gear 66 is provided on one side with worm-teeth 68$^a$, which mesh with screw-threads on worm-shaft 69, mounted underneath the table 32. On one end of shaft 69 is secured a bevel-gear 70. This gear meshes with bevel-gear 71, secured to shaft 72, and said shaft is journaled in the bearings 73 on the frame 1. To the lower end of this shaft is secured a gear-wheel 74, which meshes with an idler 75, journaled in the bearings 73, and the idler 75 meshes with gear-wheel 58. To the upper end of shaft 72 is secured bevel-gear 76. A shaft 77 is journaled in the frame 1, and to one end of this shaft is secured bevel-gear 78. A bevel-gear 79 is also secured to this shaft, which meshes with pinion 80. Said pinion is secured on the lower end of shaft 81 and the shaft journaled in frame 1. A bevel-gear 82 is secured to the upper end of shaft 81. A shaft 83 is journaled in bearing-blocks 84, secured on the frame 1. This shaft carries the driving-pulleys 85 and 86 and bevel-gear 87. Said gear meshes with gear 82. A friction-clutch 88 is secured between the driving-pulleys 85 and 86, and 89 is a lever for operating said friction-clutch.

In Fig. 1 the plunger 4 is shown in its raised position and the parts in position to receive the cellulose-pulp, which is fed into the mold from the top. When the pulp has been placed into said mold and it is desired to form a pail, the friction-clutch 23$^a$ is placed in contact with driving-pulleys 28, which will cause the plunger 4, with its attachments, to move downward into the mold, and when the said plunger has moved downward until the rim 8 rests upon the top of the upper plate 29 the friction-clutch 23$^a$ may be thrown out of engagement with the driving-pulleys 28, preferably by automatic means. The friction-clutch 88 is then set in engagement with driving-wheel 85. This will operate the different shafts carrying gear-wheels and operate the eccentric shafts 50. These shafts are connected to the staves 35. The segments 34 being in engagement with said staves, the operation of the eccentric shafts will force the said staves and segments inwardly, thus compressing the cellulose-pulp around the plunger 4. All the water or air which may be in the pulp will be forced through the perforations 4$^a$ into the hollow chamber of said plunger and removed by means of a pump connected to the hose or pipe 16. Simultaneous with the movement of the gear which forces the staves 35 and segments 34 inwardly will be operated, by means of the gear 74 on the shaft 72, the gear 78 This gear engages the screw-threads on the shaft 60 and forces the said shaft, carrying the bottom-forming die upward, thus compressing the bottom of the receptacle, causing the parts to assume the position as shown in Fig. 2. The movement of the staves and segments inwardly and the movement of the bottom compressing and forming die upwardly may be controlled, preferably, by contact-levers for throwing the friction-clutch out of engagement with the driving-wheel 85 and into engagement with wheel 86. This reverses the movement and draws the staves and segments away from the receptacle compressed around the plunger 4. When the staves and segments have been drawn away the required distance and the forming-die drawn downward, the friction-clutch 83 may be thrown out of engagement with driving-wheels 85 and 86. The friction-clutch 23ª may then be thrown in engagement with driving-wheel 28. This will raise the plunger 4 out of the mold, with the receptacle adhering thereto. The plunger 4 will continue upward until the contact-post 11 engages the spring 12, which will cause the rim 8 to force the receptacle from the plunger and enable said receptacle to be taken away. The fabric around the plunger 4 is for the purpose of preventing particles of the cellulose-pulp from entering the perforations 4ª, and the air-valve 13 is for the purpose of enabling the air to be let out of the hollow plunger. A pump is adapted to be connected to the hose 16 for pumping the water out of the hollow plunger 4, which is forced through the perforation 4ª and into the plunger during the formation of the receptacle.

Having thus fully described my invention, what I claim as new, and desire to secure by Letters Patent, is—

1. In an apparatus for forming receptacles from cellulose-pulp, comprising a main frame, an upper plate, having an opening therein, secured to said frame, a base-plate, having an opening therein, secured to the main frame below the upper plate, a plurality of concave staves, having flanges on each side thereof, disposed between the upper plate and base-plate, a plurality of concave segments held in contact with the flanges of the staves by means of the pressure of a spiral spring, said staves and segments forming a circular mold, flaring upwardly from the bottom, and forming a continuous pressing-surface against the outer surface of the receptacle, a plunger movable in and out of the mold formed by said staves and segments, eccentric shafts, carrying pinions, disposed between the upper plate and base-plate, connecting-rods connecting the stave to said eccentric shafts, thus moving the staves inwardly or outwardly when the pinions are rotated, substantially as described.

2. An apparatus for forming a receptacle from cellulose pulp, comprising a main frame, an upper plate having an opening therein, secured to said frame, a base-plate having an opening therein, secured to the main frame beneath the upper plate, a plurality of concave staves, having flanges on each side thereof disposed between the upper plate and base-plate, a plurality of concave segments held in contact with the flanges on said staves by means of the tension of a spiral spring, said staves and segments forming a circular mold, flaring upwardly from the bottom and forming a continuous pressing-surface against the outer surface of the receptacle, ribs on the under surface of the upper plate, adapted to engage the grooves in the upper and lower ends of the staves, a plunger movable in and out of the mold formed by the staves and segments, a plurality of eccentric shafts, carrying pinions, journaled in the upper plate and base-plate, connecting-rods connecting the eccentric shafts to the staves, means for operating said shafts, thus moving the staves inwardly and outwardly, substantially as described.

3. An apparatus for forming a receptacle from cellulose-pulp, comprising a main frame, an upper plate having an opening intermediate thereof secured to said frame, a base-plate, provided with an opening, secured to the main frame, beneath the upper plate, a plurality of staves and segments, disposed between the upper plate and base-plate, forming a mold, flaring outwardly from the bottom, and forming a continuous pressing-surface against the outer surface of the receptacle, means for moving the staves inwardly and outwardly, a plunger movable in and out of the mold, formed by the staves and segments, an auxiliary frame secured to the lower end of the main frame, a movable sleeve disposed between the upper plate of the auxiliary frame and the bearing-plate, a gear-wheel secured to said sleeve, screw-threads in the lower portion of said sleeve, said screw-threads engaging the screw-threads on the lower end of the shaft, which operates in the sleeve in said auxiliary frame, the upper end of said shaft having a spider to which is secured the die for forming and compressing the bottom of the receptacles, gear transmission for forming the shaft, carrying the forming-die, upward and downward, substantially as described.

4. An apparatus for forming receptacles from cellulose-pulp, comprising a main frame, an upper plate and base-plate, having openings intermediate thereof, secured to said frame, a plurality of staves and segments disposed between said upper plate and base-plate, forming a circular mold, a plunger operated vertically by means of a rack-gear, said plunger is adapted to fit into said mold, against which the cellulose-pulp is pressed by the staves and segments, and bottom-forming die, during the formation of a pail, substantially as described.

5. An apparatus for forming a receptacle from cellulose-pulp, comprising a main frame, an upper plate and base-plate having openings intermediate thereof, secured to said frame, a plurality of staves and segments disposed between the upper plate and base-plate, forming a circular mold, a plunger, operated vertically by means of rack-gear, adapted to fit into the mold, and against which the cellulose-pulp is pressed by the staves and segments, and the bottom-forming die during the formation of a receptacle, a flange on the head of the plunger, a releasing-rim normally held in contact with said flange by means of the tension of a spiral spring, a plurality of pipes rigidly secured to the head of the plunger and extending into the plunger, the upper end of said pipes connected to a bifurcated extension, substantially as described.

6. An apparatus for forming receptacles from cellulose-pulp, comprising a main frame, an upper plate and base plate rigidly secured to the main frame, openings intermediate of said upper and base-plates, a plurality of concave staves, having flanges disposed between said plates, a plurality of eccentric shafts journaled in the upper plate and base-plate and connected to said staves by means of connecting-rods, a plurality of concaved segments held in contact with the flanges on the staves by means of a spiral spring exerting lateral pressure thereon, said staves and segments forming a circular mold, pinions on the lower end of the eccentric shafts, meshing with a gear-wheel secured by means of a collar to the under surface of the base-plate, said gear-wheel meshing with a pinion on the shaft operated by the driving-pulleys, a plunger provided with a head, a releasing-rim normally held in contact with the flange on said head by means of a spiral spring encircling a contact-post, a rack-bar carrying gears, operated vertically by means of gear transmission connected with the driving-pulleys moving the plunger upward or downward, substantially as described.

7. An apparatus for forming a receptacle from cellulose-pulp comprising a main frame, an upper plate and base-plate, having openings intermediate thereof, secured to the main frame, a plurality of staves and segments disposed between the upper plate and base-plate, forming a mold, means for moving the staves and segments inwardly and outwardly, a plunger movable in and out of the mold, an auxiliary frame secured to the lower end of the main frame, a movable sleeve disposed between the upper plate intermediate of the auxiliary frame and the bearing-plate, a cylinder secured to the upper portion of the auxiliary frame and extending into the opening in the base-plate, a gear-wheel secured to said sleeve having screw-threads in the lower portion thereof, a shaft, the lower end of which is provided with external screw-threads which are adapted to engage the screw-threads in the lower end of the movable sleeve, the upper end of said shaft being provided with a spider and adapted to operate in the cylinder, a bottom-forming die secured to said spider, means for operating shaft, carrying the spider and die upwardly and downwardly, substantially as described.

8. An apparatus for forming a receptacle from cellulose-pulp comprising a main frame, an upper plate and base-plate, having openings intermediate thereof, secured to said frame, a plurality of staves and segments disposed between the said upper plate and base-plate, forming the sides of the mold for compressing the cellulose-pulp, a bottom-forming die, operated vertically, forming the bottom of the mold, a vertically-movable plunger adapted to be placed into said mold, and against which the cellulose-pulp is pressed by the inward movement of the staves and segments and the upward movement of the bottom-forming die, means for drawing staves and segments and the bottom-forming die away from the cellulose-pulp pressed against the plunger, and means for lifting the plunger with the receptacle adhering thereto out of the mold, and removing the said receptacle therefrom, substantially as described.

In testimony that I claim the foregoing as my invention I have signed my name in the presence of two subscribing witnesses.

WILLIAM GLADER.

Witnesses:
Wm. S. Swiney,
K. Schaff.